US012688614B2

(12) United States Patent
Yang et al.

(10) Patent No.:  US 12,688,614 B2
(45) Date of Patent:  Jul. 21, 2026

(54) POINT CLOUD ENCODING AND DECODING METHOD AND DEVICE BASED ON TWO-DIMENSIONAL REGULARIZATION PLANE PROJECTION

(71) Applicant: HONOR DEVICE CO., LTD., Shenzhen (CN)

(72) Inventors: Fuzheng Yang, Shenzhen (CN); Wei Zhang, Shenzhen (CN); Ke Zhang, Shenzhen (CN); Yuxin Du, Shenzhen (CN); Zexing Sun, Shenzhen (CN); Youguang Yu, Shenzhen (CN); Tian Chen, Shenzhen (CN); Wenjie Zou, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 236 days.

(21) Appl. No.: 18/257,378

(22) PCT Filed: Feb. 7, 2022

(86) PCT No.: PCT/CN2022/075383
§ 371 (c)(1),
(2) Date: Jun. 14, 2023

(87) PCT Pub. No.: WO2022/166958
PCT Pub. Date: Aug. 11, 2022

(65) Prior Publication Data
US 2024/0119636 A1     Apr. 11, 2024

(30) Foreign Application Priority Data
Feb. 8, 2021   (CN) ......................... 202110181878.X

(51) Int. Cl.
*G06T 9/00* (2006.01)
*G06T 3/00* (2024.01)
*G06T 3/12* (2024.01)

(52) U.S. Cl.
CPC . *G06T 9/00* (2013.01); *G06T 3/12* (2024.01)

(58) Field of Classification Search
CPC .. G06T 9/00; G06T 3/12; G06T 9/004; G06T 9/001; G06T 7/20; G06T 7/207;
(Continued)

(56) References Cited

U.S. PATENT DOCUMENTS 11,368,719 B2 *   6/2022   Oh ......................... H04N 19/44
11,463,681 B2   10/2022   Aflaki Beni et al.
(Continued)

FOREIGN PATENT DOCUMENTS

JP        2024500486 A      1/2024
WO     2019012975 A1     1/2019
(Continued)

OTHER PUBLICATIONS

Mammou et al., "[G-PCC][New proposal] Optimization of the predictive coding scheme for Spinning Lidars," ISO/IEC JTC1/SC29/WGil MPEG2020/ m53618, Alpbach, AT, Apr. 15, 2020, 6 pages.
(Continued)

*Primary Examiner* — Sumati Lefkowitz
*Assistant Examiner* — Wayne Zhang
(74) *Attorney, Agent, or Firm* — Fish & Richardson P.C.

(57) ABSTRACT

Disclosed are a point cloud encoding and decoding method and device based on a two-dimensional regularization plane projection. The encoding method includes: acquiring original point cloud data; performing two-dimensional regularization plane projection on the original point cloud data to obtain a two-dimensional projection plane structure; obtain-
(Continued)

ing a plurality of pieces of two-dimensional image information according to the two-dimensional projection plane structure; and encoding the plurality of pieces of two-dimensional image information to obtain code stream information.

10 Claims, 7 Drawing Sheets

(58) Field of Classification Search
CPC .. H04N 19/597; H04N 13/106; H04N 13/161; H04N 19/50; H04N 19/85; H04N 19/124
See application file for complete search history.

(56) References Cited

U.S. PATENT DOCUMENTS

| | | | |
|---|---|---|---|
| 11,508,096 B2 | 11/2022 | Kuma et al. |
| 11,778,171 B2 | 10/2023 | Hannuksela et al. |
| 2015/0249815 A1 | 9/2015 | Sandrew et al. |
| 2019/0087978 A1 | 3/2019 | Tourapis et al. |

| | | | | |
|---|---|---|---|---|
| 2020/0296401 A1 | | 9/2020 | Lee et al. | |
| 2023/0334705 A1 * | | 10/2023 | Yano | G06T 9/00 |
| 2024/0046528 A1 | | 2/2024 | Taquet et al. | |

FOREIGN PATENT DOCUMENTS

| | | | | |
|---|---|---|---|---|
| WO | 2019162567 A1 | | 8/2019 | |
| WO | 2020013631 A1 | | 1/2020 | |
| WO | 2020141248 A1 | | 7/2020 | |
| WO | 2020187140 A1 | | 9/2020 | |
| WO | WO-2020248187 A1 * | 12/2020 | H04N 21/4402 |
| WO | 2022050088 A1 | | 3/2022 | |

OTHER PUBLICATIONS

Nlguchi et al., "[G-PCC][New]Predictive geometry angular mode using spherical LiDAR data input," ISO/IEC JTC1/SC29/WG7 MPEG2020/m55361, Oct. 7, 2020, 4 pages.

Taquet et al., "[G-PCC][New] Improved Quantization of Azimuthal Angle in Predictive Geometry Coding," ISO/IEC JTC1/SC 29/WG 7 m55979, Jan. 6, 2021, 10 pages.

Office Action in Japanese Appln. No. 2025-017668, mailed on Oct. 23, 2025, 7 pages (with English translation).

* cited by examiner

POINT CLOUD ENCODING AND DECODING METHOD AND DEVICE BASED ON TWO-DIMENSIONAL REGULARIZATION PLANE PROJECTION

CROSS-REFERENCE TO RELATED APPLICATIONS

This application is a national stage of International Application No. PCT/CN2022/075383, filed on Feb. 7, 2022, which claims priority to Chinese Patent Application No. 202110181878. X, filed on Feb. 8, 2021. The disclosures of the aforementioned applications are hereby incorporated by reference in their entireties.

TECHNICAL FIELD

The present invention relates to technical field of encoding and decoding, and specifically, to a point cloud encoding and decoding method and device based on a two-dimensional regularization plane projection.

BACKGROUND

With the improvement of hardware processing capabilities and the rapid development of computer vision, the three-dimensional point cloud has become a new generation of immersive multimedia after audio, image, and video, and is widely applied to virtual reality, augmented reality, automated driving, environmental modeling, and the like. However, the three-dimensional point cloud usually has a relatively large amount of data, which is not conducive to the transmission and storage of point cloud data. Therefore, it is of great significance to study an efficient point cloud encoding and decoding technology.

In the existing geometry-based point cloud compression (G-PCC, Geometry-based Point Cloud Compression) encoding framework, the geometry information and attribute information of the point cloud are encoded separately. At present, the G-PCC geometric encoding and decoding may be divided into octree-based geometric encoding and decoding and prediction tree-based geometric encoding and decoding.

Octree-based geometric encoding and decoding: At an encoder side, firstly, the geometry information of the point cloud is preprocessed, which includes the coordinate conversion and voxelization process of the point cloud. Subsequently, tree division (octree/quadtree/binary tree) is continuously performed on a bounding box in which the point cloud is located in the order of breadth-first traversal. Finally, the placeholder code of each node is encoded, and the quantity of points included in each leaf node is encoded, to generate a binary code stream. At a decoder side, firstly, the placeholder code of each node is continuously obtained by parsing in the order of breadth-first traversal. Subsequently, tree division is continuously performed in sequence, and the division stops until a unit cube of 1×1×1 is obtained through division. Finally, the quantity of points included in each leaf node is obtained by parsing, and finally reconstructed point cloud geometry information is obtained.

Prediction tree-based geometric encoding and decoding: At the encoder side, firstly, an inputted point cloud is sorted. Subsequently, a prediction tree structure is established. By classifying each point to a laser scanner to which the point belongs, the prediction tree structure is established according to different laser scanners. Subsequently, each node in the prediction tree is traversed, geometry information of the nodes is predicted by selecting different prediction modes to obtain predicted residuals, the predicted residuals are quantized by using a quantization parameter. Finally, the prediction tree structure, the quantization parameter, the predicted residuals of the geometry information of the nodes, and the like are encoded to generate a binary code stream. At the decoder side, firstly, the code stream is analyzed; then the prediction tree structure is reconstructed; subsequently the predicted residuals are dequantized based on the predicted residual of the geometry information of each node obtained by parsing and the quantization parameter; and finally reconstructed geometry information of each node is restored. That is, reconstruction of point cloud geometry information is completed.

However, due to relatively strong spatial sparsity of the point cloud, for the point cloud encoding technology using an octree structure, this structure will lead to a relatively large proportion of empty nodes obtained by division, and the spatial correlation of the point cloud cannot be fully reflected, which is not conducive to point cloud prediction and entropy encoding. In the prediction tree-based point cloud encoding and decoding technology, some parameters of the lidar device are used to establish a tree structure, and the tree structure is used for predictive encoding based on this. However, the tree structure does not fully reflect the spatial correlation of the point cloud, which is not conducive to point cloud prediction and entropy encoding. Therefore, both of the foregoing two point cloud encoding and decoding technologies have the problem of insufficiently high encoding efficiency.

SUMMARY

To resolve the foregoing problem in the existing technologies, the present invention provides a point cloud encoding and decoding method and device based on a two-dimensional regularization plane projection. The technical problem to be resolved in the present invention is implemented by the following technical solutions:

A point cloud encoding method based on a two-dimensional regularization plane projection is provided, including:

acquiring original point cloud data;

performing two-dimensional regularization plane projection on the original point cloud data to obtain a two-dimensional projection plane structure;

obtaining a plurality of pieces of two-dimensional image information according to the two-dimensional projection plane structure; and encoding the plurality of pieces of two-dimensional image information to obtain code stream information.

In an embodiment of the present invention, the plurality of pieces of two-dimensional image information include a projection residual information map.

In an embodiment of the present invention, the encoding the plurality of pieces of two-dimensional image information to obtain code stream information includes:

encoding the projection residual information map to obtain a projection residual information code stream.

In an embodiment of the present invention, the encoding the projection residual information map to obtain a projection residual information code stream includes:

performing prediction on a pixel in the projection residual information map based on a placeholder information map and a depth information map to obtain a predicted residual of a projection residual; or performing prediction on a pixel in the projection residual information map based on reconstructed projection residual information of encoded and decoded pixels to obtain a predicted residual; and encoding the predicted residual of the projection residual to obtain the projection residual information code stream.

In an embodiment of the present invention, the performing prediction on a pixel in the projection residual information map based on a placeholder information map and a depth information map to obtain a predicted residual of a projection residual includes:

traversing pixels in the projection residual information map in a specific scanning order, and identifying encoded and decoded non-empty pixels in an adjacent region of a current non-empty pixel according to the placeholder information map;

establishing a relationship between depth information and the reconstructed projection residual information by using the encoded and decoded non-empty pixels, and estimating projection residual information corresponding to a current pixel according to the relationship, to obtain an estimated value of a projection residual of the current pixel; and using the estimated value as a predicted value of the projection residual of the current pixel, to obtain a predicted residual of the projection residual of the current pixel.

In an embodiment of the present invention, the encoding the projection residual information map to obtain a projection residual information code stream further includes:

performing prediction on a pixel in the projection residual information map based on a placeholder information map to obtain a predicted residual of a projection residual; or performing prediction on a pixel in the projection residual information map based on a depth information map to obtain a predicted residual of a projection residual; and encoding the predicted residual of the projection residual to obtain the projection residual information code stream.

Another embodiment of the present invention further provides a point cloud encoding device based on a two-dimensional regularization plane projection, including:

a first data acquisition module, configured to acquire original point cloud data;

a projection module, configured to perform two-dimensional regularization plane projection on the original point cloud data to obtain a two-dimensional projection plane structure;

a data processing module, configured to obtain a plurality of pieces of two-dimensional image information according to the two-dimensional projection plane structure; and an encoding module, configured to encode the plurality of pieces of two-dimensional image information to obtain code stream information.

Still another embodiment of the present invention further provides a point cloud decoding method based on a two-dimensional regularization plane projection, including:

acquiring code stream information and decoding the code stream information to obtain parsed data;

reconstructing a plurality of pieces of two-dimensional image information according to the parsed data;

obtaining a two-dimensional projection plane structure according to the plurality of pieces of two-dimensional image information; and reconstructing a point cloud by using the two-dimensional projection plane structure.

In an embodiment of the present invention, the reconstructing a plurality of pieces of two-dimensional image information according to the parsed data includes:

reconstructing, according to predicted residuals of a projection residual information map in the parsed data, the projection residual information map to obtain a reconstructed projection residual information map.

Still another embodiment of the present invention further provides a point cloud decoding device based on a two-dimensional regularization plane projection, including:

a second data acquisition module, configured to acquire code stream information and decode the code stream information to obtain parsed data;

a first reconstruction module, configured to reconstruct a plurality of pieces of two-dimensional image information according to the parsed data;

a second reconstruction module, configured to obtain a two-dimensional projection plane structure according to the plurality of pieces of two-dimensional image information; and a point cloud reconstruction module, configured to reconstruct a point cloud by using the two-dimensional projection plane structure.

Beneficial Effects of the Present Invention are as Follows:

1. According to the present invention, a point cloud in a three-dimensional space is projected to a corresponding two-dimensional regularization projection plane structure, and regularization correction is performed on the point cloud in a vertical direction and a horizontal direction, to obtain a strong correlation representation of the point cloud on the two-dimensional projection plane structure, so that sparsity in a three-dimensional representation structure is avoided, and the spatial correlation of the point cloud is better reflected; and when a plurality of pieces of two-dimensional image information obtained for the two-dimensional regularization projection plane structure are encoded subsequently, the spatial correlation of the point cloud can be greatly utilized, and the spatial redundancy is reduced, thereby further improving the encoding efficiency of the point cloud.

2. According to the present invention, a placeholder information map and a depth information map are used for assisting in encoding the projection residual information map, so that the encoding efficiency is improved.

3. According to the present invention, a projection residual information map may further be used for assisting in encoding other two-dimensional maps, to improve the encoding efficiency.

The following further describes the present invention in detail with reference to the accompanying drawings and the embodiments.

DESCRIPTION OF EMBODIMENTS

The present invention is further described in detail below with reference to specific embodiments, but the implementations of the present invention are not limited thereto.

Embodiment 1

Figure 1:
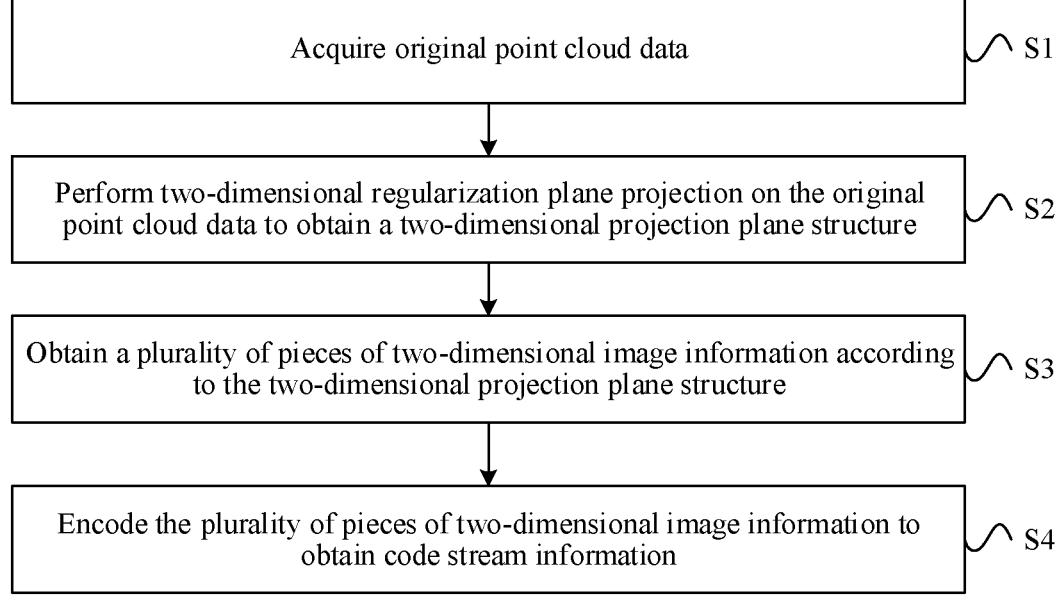
FIG. 1 is a schematic diagram of a point cloud encoding method based on a two-dimensional regularization plane projection according to an embodiment of the present invention.

FIG. 1 is a schematic diagram of a point cloud encoding method based on a two-dimensional regularization plane projection according to an embodiment of the present invention, which includes:

S1: Acquire original point cloud data.

Specifically, the original point cloud data usually includes a group of three-dimensional space points, and each space point records its geometric position information and additional attribute information such as color, reflectivity, and normal. The geometric position information of the point cloud is generally expressed based on a Cartesian coordinate system, that is, expressed by using the coordinates x, y, and z of points. The original point cloud data may be acquired through 3D scanning devices such as a lidar, and may alternatively be acquired based on public datasets provided by various platforms. In this embodiment, it is assumed that the geometric position information of the acquired original point cloud data is expressed based on the Cartesian coordinate system. It should be noted that the representation method of the geometric position information of the original point cloud data is not limited to Cartesian coordinates.

S2: Perform two-dimensional regularization plane projection on the original point cloud data to obtain a two-dimensional projection plane structure.

Specifically, in this embodiment, before two-dimensional regularization plane projection is performed on the original point cloud, preprocessing such as voxelization processing may further be performed on the original point cloud data, to facilitate subsequent encoding.

First, the two-dimensional projection plane structure is initialized.

Initialization of the two-dimensional regularization projection plane structure of the point cloud requires the use of regularization parameters. The regularization parameters are usually finely measured by the manufacturer and provided to consumers as one of the necessary data, such as an acquisition range of a lidar, a sampling angular resolution $\Delta\varphi$ or the quantity of sampling points of the horizontal azimuth angle, a distance correction factor of each laser scanner, offset information $V_o$ and $H_o$ of the laser scanner in the vertical direction and the horizontal direction, and offset information $\theta_0$ and $\alpha$ of the laser scanner along the pitch angle and the horizontal azimuth angle.

It should be noted that the regularization parameters are not limited to the parameters given above. Given calibration parameters of the lidar may be used as the regularization parameters, or the regularization parameters may be obtained in manners such as optimizing estimation and data fitting in a case that the calibration parameters of the lidar are not given.

The two-dimensional regularization projection plane structure of the point cloud is a data structure including M rows and N columns of pixels, and points in the three-dimensional point cloud correspond to the pixels in the data structure after projection. In addition, a pixel (i, j) in the data structure may be associated with a cylindrical coordinate component $(\theta, \phi)$. For example, the pixel (i, j) corresponding to a cylindrical coordinate $(r, \theta, \phi)$ may be found by using the following formula.

$$i = \min_{1, 2, \ldots LaserNum} |\theta - \theta_0|;$$

$$j = (\phi + 180°)/\Delta\varphi.$$

Figure 2:
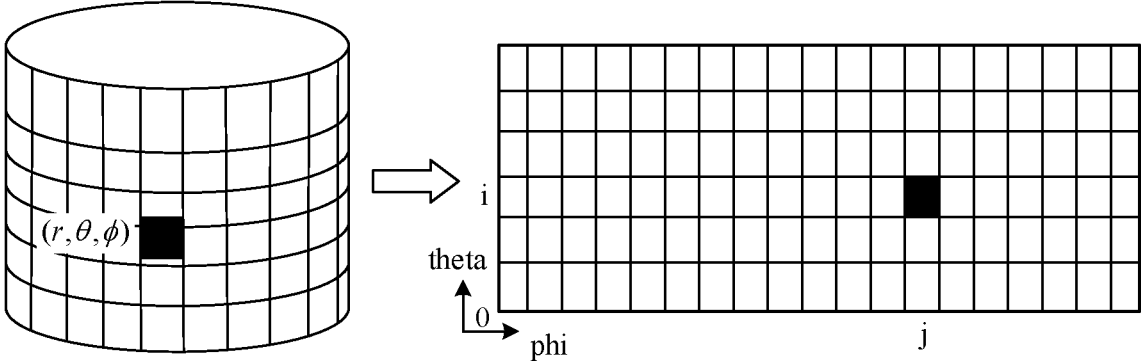
FIG. 2 is a schematic diagram of a correspondence between cylindrical coordinates of points and pixels in a two-dimensional projection plane according to an embodiment of the present invention.

Specifically, FIG. 2 is a schematic diagram of a correspondence between cylindrical coordinates of points and pixels in a two-dimensional projection plane according to an embodiment of the present invention. It should be noted that the correspondence of pixels herein is not limited to cylindrical coordinates.

Further, the resolution of the two-dimensional regularization projection plane may be obtained by using the regularization parameters. For example, it is assumed that the resolution of the two-dimensional regularization projection plane is M×N, then the quantity of laser scanners in the regularization parameters may be used to initialize M, and the sampling angle resolution $\Delta\varphi$ of the horizontal azimuth angle (or the quantity of sampling points of the laser scanner) is used to initialize N. For example, the following formula may be used, and finally the initialization of the two-dimensional projection plane structure can be completed, to obtain a plane structure including M×N pixels.

$$M = laserNum;$$

$$N = \frac{360°}{\Delta\varphi} \text{ or } N = pointNumPerLaser.$$

In addition, a mapping relationship between the original point cloud data and the two-dimensional projection plane structure is determined, so as to project the original point cloud data onto the two-dimensional projection plane structure.

In this part, by determining the position of the original point cloud in the two-dimensional projection plane structure point by point, and the point cloud originally distributed disorderly in the Cartesian coordinate system is mapped onto the evenly distributed two-dimensional regularization projection plane structure. Specifically, for each point in the original point cloud, a corresponding pixel is determined in the two-dimensional projection plane structure. For example, a pixel with the shortest spatial distance from a projection position of the point in the two-dimensional plane may be selected as the corresponding pixel of the point.

If a cylindrical coordinate system is used for two-dimensional projection, the specific process of determining pixels corresponding to the original point cloud is as follows:

a. A cylindrical coordinate component r of a current point in the original point cloud data is determined, and specifically, the following formula is used for calculation:

$$r = \sqrt{x^2 + y^2}.$$

b. A search region of the current point in the two-dimensional projection plane structure is determined. Specifically, the entire two-dimensional projection plane structure may be directly selected as the search region. Further, to reduce the amount of calculation, the pitch angle $\theta$ and azimuth angle $\phi$ of the cylindrical coordinate component of the current point may further be used to determine the search region of the corresponding pixel in the two-dimensional projection plane structure, to reduce the search region.

c. After the search region is determined, for each pixel (i, j) in the search region, the regularization parameters, that is, the calibration parameters $\theta_0$, $V_o$, $H_o$, and $\alpha$ of the $i^{th}$ laser scanner of the lidar, are used to calculate the position (xl, yl, zl) of the current pixel in the Cartesian coordinate system, where the specific calculation formula is as follows:

$$\theta_i = \theta_0$$

$$\phi_j = -180° + j \times \Delta\varphi$$

$$xl = r \cdot \sin(\phi_j - \alpha) - H_o \cdot \cos(\phi_j - \alpha)$$

$$yl = r \cdot \cos(\phi_j - \alpha) + H_o \cdot \sin(\phi_j - \alpha)$$

$$zl = r \cdot \tan \theta_i + V_o$$

d. After the position (xl, yl, zl) of the current pixel in the Cartesian coordinate system is obtained, a spatial distance between the position and the current point (x, y, z) is calculated and used as an error Err, that is:

$$Err = dist\{(x, y, z), (xl, yl, zl)\}$$

If the error Err is less than a current minimum error minErr, the error Err is used to update the minimum error minErr, and i and j corresponding to the current pixel are used to update i and j of the pixel corresponding to the current point; and if the error Err is greater than the minimum error minErr, the foregoing update process will not be performed.

e. After all the pixels in the search region have been traversed, the corresponding pixel (i, j) of the current point in the two-dimensional projection plane structure can be determined.

Figure 3:
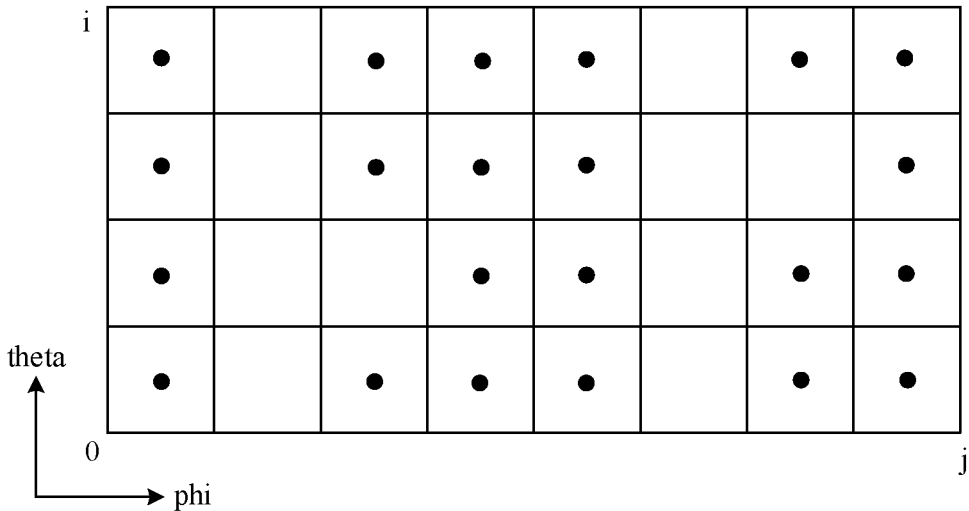
FIG. 3 is a schematic diagram of a two-dimensional projection plane structure of a point cloud according to an embodiment of the present invention.

When the foregoing operations have been completed for all the points in the original point cloud, the two-dimensional regularization plane projection of the point cloud is completed. Specifically, FIG. 3 is a schematic diagram of a two-dimensional projection plane structure of a point cloud according to an embodiment of the present invention. Each point in the original point cloud data is mapped to a corresponding pixel in the structure.

It should be noted that during the two-dimensional regularization plane projection of the point cloud, a plurality of points in the point cloud may correspond to the same pixel in the two-dimensional projection plane structure. To avoid this situation, these space points may be chosen to be projected to different pixels during projection. For example, during projection of a certain point, if the pixel corresponding to the point already has a corresponding point, the point is projected to an empty pixel adjacent to the pixel. In addition, if a plurality of points in the point cloud have been projected to the same pixel in the two-dimensional projection plane structure, during encoding based on the two-dimensional projection plane structure, the quantity of corresponding points in each pixel should be additionally encoded, and information of each corresponding point in the pixel is encoded according to the quantity of points.

S3: Obtain a plurality of pieces of two-dimensional image information according to the two-dimensional projection plane structure.

In this embodiment, the plurality of pieces of two-dimensional image information include a projection residual information map.

Figure 4:
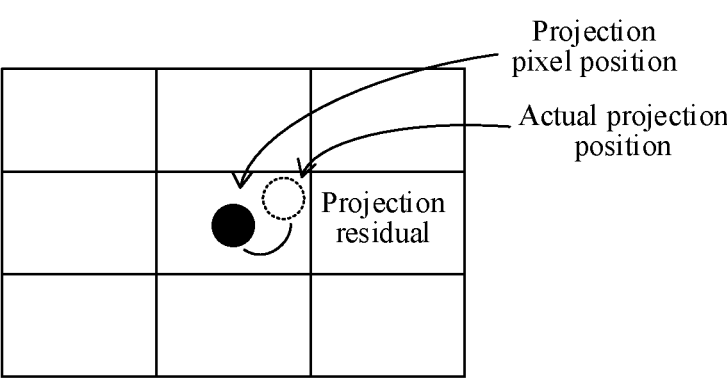
FIG. 4 is a schematic diagram of a projection residual according to an embodiment of the present invention.

Specifically, the projection residual information map is used to represent a residual between a corresponding position and an actual projection position of each occupied pixel in the two-dimensional regularization projection plane structure. FIG. 4 is a schematic diagram of a projection residual according to an embodiment of the present invention.

In this embodiment, the projection residual of the pixel may be calculated in the following manner. It is assumed that the current pixel is (i, j), and a Cartesian coordinate of a corresponding point of the current pixel is (x, y, z), then the actual projection position of the point may be expressed as ($\phi'$, i'), which may be calculated by using the following formula:

$$\phi' = \arctan\left(\frac{y}{x}\right)$$

$$i' = \arg\min_{1, 2 \,\dots\, LaserNum} |z - V_o - r \times \tan(\theta_0)|$$

The corresponding position of the current pixel may be expressed as ($\phi_j$, i), which may be calculated by using the following formula:

$$\phi_j = -180° + j \times \Delta\phi$$

Therefore, the projection residual ($\Delta\phi$, $\Delta i$) corresponding to the current pixel may be calculated by using the following formula:

$$\Delta\phi = \phi' - \phi_j$$

$$\Delta i = i' - i$$

Based on the foregoing calculation, each occupied pixel in the two-dimensional regularization projection plane has a projection residual, so that a projection residual information map corresponding to the point cloud is obtained.

S4: Encode the plurality of pieces of two-dimensional image information to obtain code stream information.

Correspondingly, the encoding the plurality of pieces of two-dimensional image information to obtain code stream information includes: encoding the projection residual information map to obtain a projection residual information code stream. Specifically, prediction first needs to be performed on the projection residual information map, to obtain a predicted residual of projection residual information, and then the predicted residual is encoded.

In this embodiment, prediction may be performed on a pixel in the projection residual information map by using a placeholder information map, a depth information map, and reconstructed projection residual information of encoded and decoded pixels to obtain a predicted residual.

The placeholder information map is used to identify whether each pixel in the two-dimensional regularization projection plane structure is occupied, that is, whether each pixel corresponds to a point in the point cloud. If each pixel is occupied, the pixel is referred to as being non-empty; otherwise, the pixel is referred to as being empty. In this way, the placeholder information map of the point cloud may be obtained according to the two-dimensional projection plane structure of the point cloud. The depth information map is used to represent a distance between a corresponding point of each occupied pixel in the two-dimensional regularization projection plane structure and a coordinate origin. For example, the cylindrical coordinate component r of the point corresponding to the pixel may be used as a depth of the pixel. Based on this, each occupied pixel in the two-dimensional regularization projection plane structure has a depth value, so that a corresponding depth information map is obtained. Both the placeholder information map and the depth information map may be directly obtained from the two-dimensional projection plane structure.

Figures 5, 6:
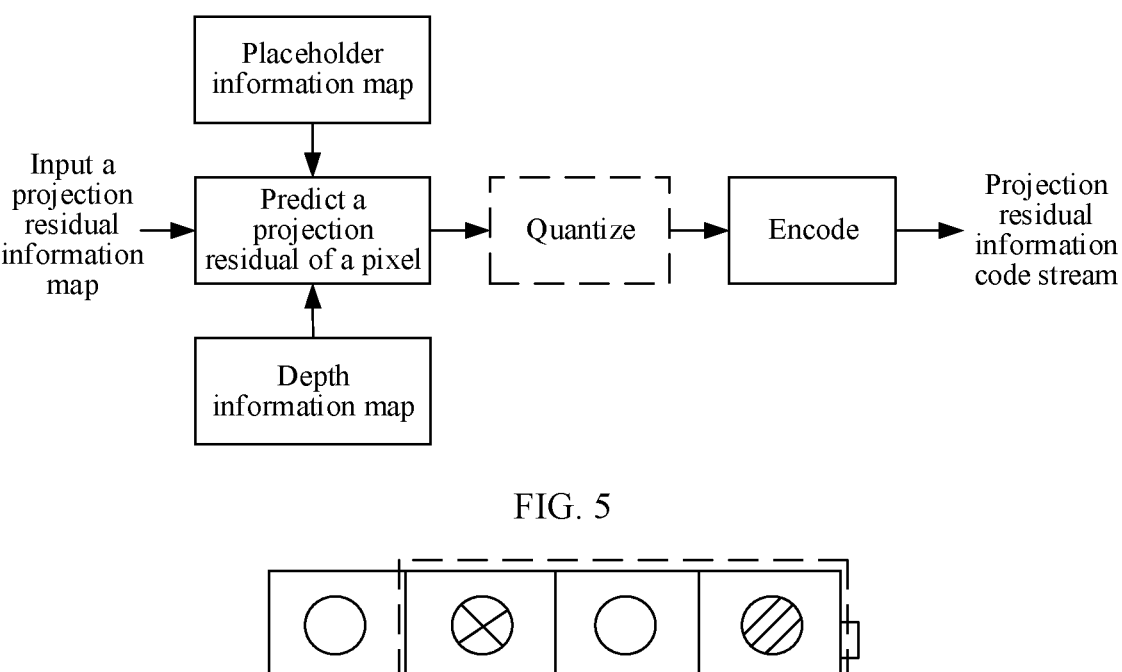
FIG. 5 is an encoding block diagram of a projection residual information map according to an embodiment of the present invention.
FIG. 6 is a schematic prediction diagram of projection residual information according to an embodiment of the present invention.

FIG. 5 is an encoding block diagram of a projection residual information map according to an embodiment of the present invention, which specifically includes:

41) Predict a Projection Residual of a Pixel

In this embodiment, the projection residual of the current pixel may be predicted based on the placeholder information map, the depth information map, and the reconstructed projection residual information of the encoded and decoded pixels of the point cloud.

Specifically, the encoded and decoded non-empty pixels in the adjacent region of the current non-empty pixel may be identified according to the placeholder information map, then a relationship between depth information and the reconstructed projection residual information is established by using these encoded and decoded non-empty pixels, and finally the projection residual information corresponding to the current pixel may be estimated based on the depth information of the current pixel and the relationship, and used as a predicted value of the projection residual of the current pixel.

More specifically, each pixel in the projection residual information map may be traversed in a specific scanning order, for example, Z-shaped scanning. Subsequently, whether the current pixel is non-empty is determined according to the placeholder information map, and encoded and decoded non-empty pixels in the adjacent region of the current non-empty pixel are identified according to the placeholder information map. Subsequently, a plurality of reference pixels with depth information close to that of the current pixel are selected from the encoded and decoded non-empty pixels in the adjacent region of the current non-empty pixel, and an average value of reconstructed projection residuals of all the reference pixels is used as an estimated value of the projection residual of the current pixel.

FIG. 6 is a schematic prediction diagram of projection residual information according to an embodiment of the present invention, where ☆ represents the current pixel, ◯ represents a referenceable pixel in the adjacent region, ⊘ represents a neighboring pixel with a relatively large difference in depth information from the current pixel, and ⊗ represents an encoded and decoded unoccupied empty pixel.

During prediction of the projection residual of the current pixel, the placeholder information map is first used to determine the occupancy of the encoded and decoded pixels in the adjacent region of the current pixel, that is, the dashed box, and then non-empty pixels therein are identified, and then a relationship between the depth information and the reconstructed projection residual information may be simply established by using the encoded and decoded non-empty pixels. For example, the following relationship may be established: if depth information of two pixels is close, their projection residuals are also close, so that pixels with depth information close to that of the current pixel may be selected from these encoded and decoded non-empty pixels as reference pixels, and reconstructed projection residual information of the reference pixels is averaged as a predicted value of the projection residual information of the current pixel. The predicted value of the projection residual information of the current pixel is denoted as ($\Delta\phi$_pred, $\Delta$i_pred), then a calculation formula thereof is as follows:

$$\Delta\phi\_pred = \sum_{j=1}^{N} \Delta\phi_j/N$$

$$\Delta i\_pred = \sum_{j=1}^{N} \Delta i_j/N$$

where ($\Delta\phi_j$, $\Delta i_j$), j=1, 2 ... N is a reconstructed projection residual of a neighbor reference pixel of the current pixel, and N is the quantity of reference pixels in the adjacent region. After the predicted value of the projection residual of the current pixel is obtained, a difference between an original projection residual and a predicted projection residual of the current pixel is calculated, and a predicted residual of the projection residual of the current pixel is obtained.

In this embodiment, prediction may alternatively be performed on a pixel in the projection residual information map separately based on a placeholder information map to obtain a predicted residual of a projection residual; or prediction is performed on a pixel in the projection residual information map based on a depth information map, to obtain a predicted residual of a projection residual. The detailed process is not described herein again.

According to the present invention, during encoding of the projection residual information, a placeholder information map and a depth information map are used for assisting in prediction of the projection residual information map, thereby improving the encoding efficiency.

In another embodiment of the present invention, a conventional encoding method may alternatively be used to perform prediction on a pixel in the projection residual information map directly according to reconstructed projection residual information of encoded and decoded pixels to obtain a predicted residual.

In addition, an optimal prediction mode may alternatively be selected from a plurality of preset prediction modes through a rate-distortion optimization model to perform prediction on a pixel in the projection residual information map to obtain a predicted residual.

For example, six prediction modes may be set as follows:

Mode0: Direct mode, skip prediction and directly perform compression;

Mode1: To-the-left prediction, use a non-empty pixel on the left as a reference pixel;

Mode2: Upward prediction, use a non-empty pixel above as a reference pixel;

Mode3; Upper left prediction, use a non-empty pixel on the upper left as a reference pixel;

Mode4: Upper right prediction, use a non-empty pixel on the upper right as a reference pixel;

Mode5: Use non-empty pixels on the left, above, on the upper left, and on the upper right as reference pixels.

An optimal mode is selected for prediction through a rate-distortion model to obtain the predicted residual.

42) Encode the Predicted Residual to Obtain the Projection Residual Information Code Stream.

After prediction of the projection residual information is completed, the predicted residual needs to be encoded. It should be noted that when lossy encoding is performed on the projection residual information map, the predicted residual of the projection residual information need to be quantized before encoding. When lossless encoding is performed on the projection residual information map, the predicted residual does not need to be quantized.

Figure 7:
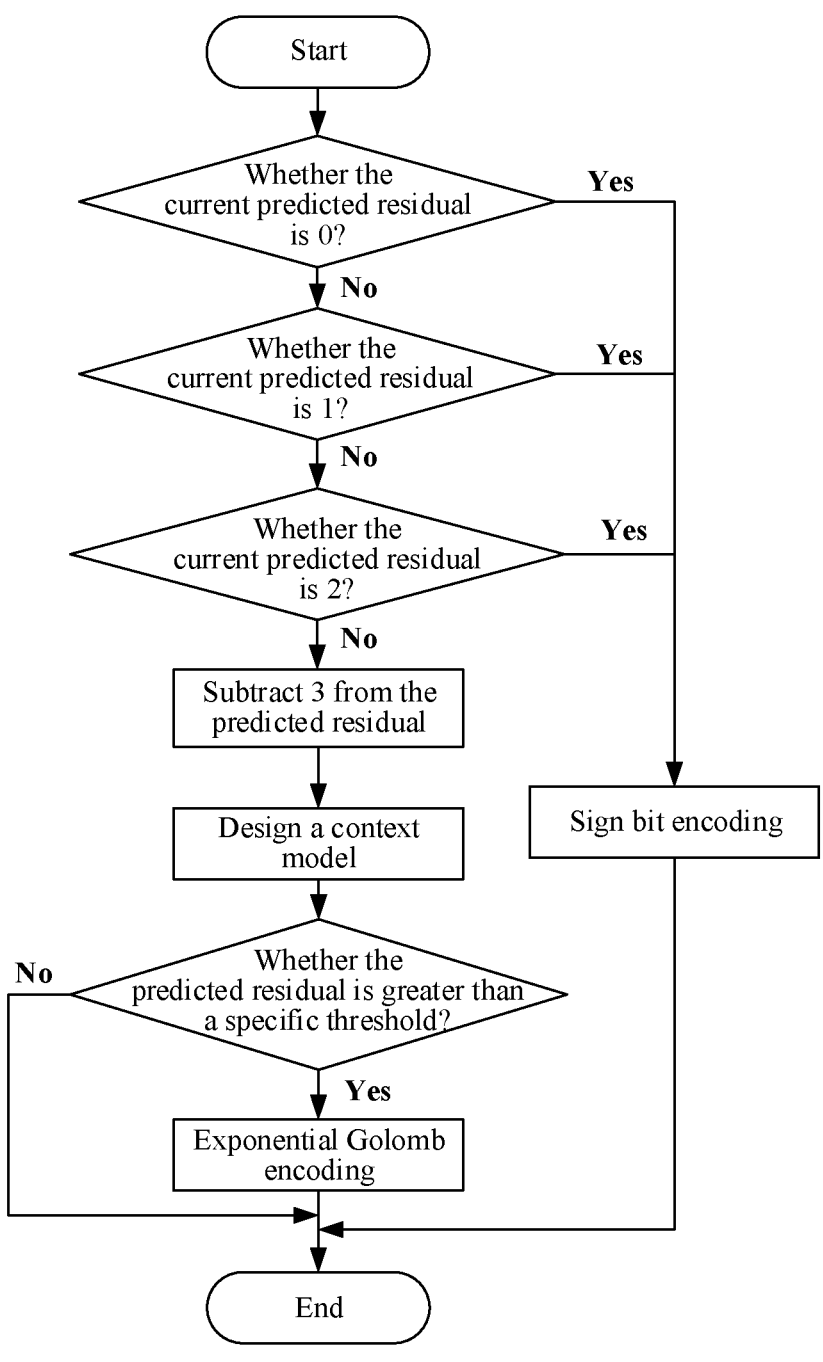
FIG. 7 is a flowchart of entropy encoding of a predicted residual of a projection residual according to an embodiment of the present invention.

Specifically, this embodiment is implemented in a context-based entropy encoding manner. For example, the entropy encoding process shown in FIG. 7 may be used to encode the predicted residual. The specific encoding process is as follows:

a. first determine whether the predicted residual information of the projection residual of the current pixel is 0, and if the predicted residual information is 0, encode the 0 identifier, and skip performing subsequent encoding;

b. otherwise, determine whether the predicted residual information of the projection residual of the current pixel is 1, if the predicted residual information is 1, encode the 1 identifier, and skip performing subsequent encoding;

c. otherwise, determine whether the predicted residual of the projection residual of the current pixel is 2, if the predicted residual is 2, encode the 2 identifier, and skip performing subsequent encoding;

d. otherwise, subtract 3 from the current predicted residual value, and then determine whether the predicted residual is greater than a specific threshold; and if the predicted residual is less than the specific threshold, design a context model for the current predicted residual; otherwise, perform encoding in the following manner:

designing context for predicted residual information of a part of which the predicted residual is less than the threshold for encoding; and performing exponential Golomb encoding on the predicted residual information of a part of which the predicted residual is greater than the threshold.

So far, the encoding of the projection residual information map is completed.

In addition, in another embodiment of the present invention, the projection residual information map may alternatively be encoded through image/video compression. Encoding solutions that can be used herein include, but not limited to: JPEG, JPEG2000, HEIF, H.264\AVC, H.265\HEVC, and the like.

In another embodiment of the present invention, other information maps obtained according to the two-dimensional projection plane structure, such as a placeholder information map, a depth information map, a coordinate conversion error information map, and an attribute information map, may further be encoded to obtain corresponding code stream information.

According to the present invention, a point cloud in a three-dimensional space is projected to a corresponding two-dimensional regularization projection plane structure, and regularization correction is performed on the point cloud in a vertical direction and a horizontal direction, to obtain a strong correlation representation of the point cloud on the two-dimensional projection plane structure, so that sparsity in a three-dimensional representation structure is avoided, and the spatial correlation of the point cloud is better reflected; and when the projection residual information map and other two-dimensional image information are encoded subsequently, the spatial correlation of the point cloud can be greatly utilized, and the spatial redundancy is reduced, thereby further improving the encoding efficiency of the point cloud.

Embodiment 2

Figure 8:
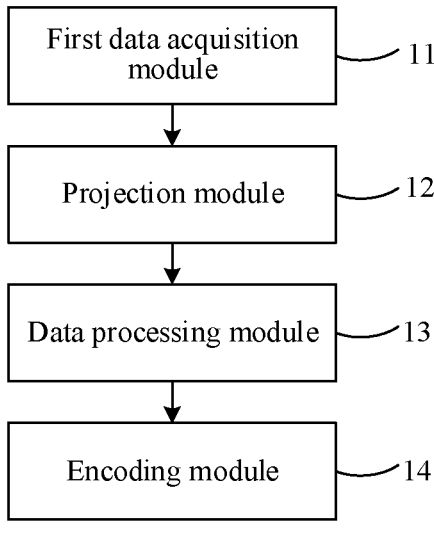
FIG. 8 is a schematic structural diagram of a point cloud encoding device based on a two-dimensional regularization plane projection according to an embodiment of the present invention.

Based on Embodiment 1, this embodiment provides a point cloud encoding device based on a two-dimensional regularization plane projection. FIG. 8 is a schematic structural diagram of a point cloud encoding device based on a two-dimensional regularization plane projection according to an embodiment of the present invention, which includes:

a first data acquisition module 11, configured to acquire original point cloud data;

a projection module 12, configured to perform two-dimensional regularization plane projection on the original point cloud data to obtain a two-dimensional projection plane structure;

a data processing module 13, configured to obtain a plurality of pieces of two-dimensional image information according to the two-dimensional projection plane structure; and an encoding module 14, configured to encode the plurality of pieces of two-dimensional image information to obtain code stream information.

The encoding device provided in this embodiment can implement the encoding method described in Embodiment 1, and the detailed process is not described herein again.

Embodiment 3

Figure 9:
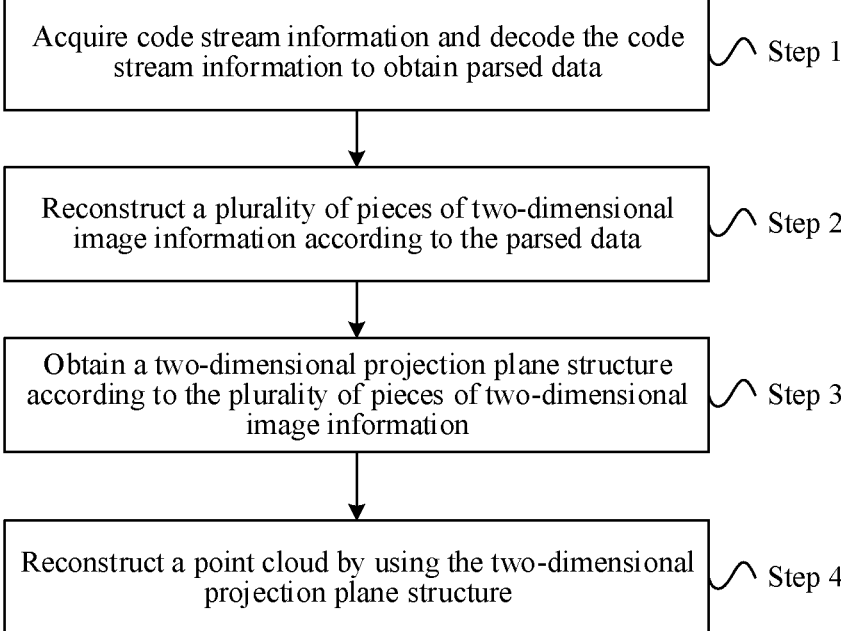
FIG. 9 is a schematic diagram of a point cloud decoding method based on a two-dimensional regularization plane projection according to an embodiment of the present invention.

FIG. 9 is a schematic diagram of a point cloud decoding method based on a two-dimensional regularization plane projection according to an embodiment of the present invention, the method includes:

Step 1: Acquire code stream information and decoding the code stream information to obtain parsed data.

A decoder side acquires compressed code stream information, and uses a corresponding existing entropy decoding technology to perform corresponding decoding on the code stream information to obtain the parsed data.

The specific decoding process is as follows:

a. first parse whether the predicted residual information of the projection residual of the current pixel is 0, if the predicted residual information is 0, the predicted residual of the current pixel is 0, and skip performing subsequent decoding;

b. otherwise, parse whether the predicted residual information of the projection residual of the current pixel is 1, if the predicted residual information is 1, the predicted residual of the current pixel is 1, and skip performing subsequent decoding;

c. otherwise, parse whether the predicted residual information of the projection residual of the current pixel is 2, if the predicted residual information is 2, the predicted residual of the current pixel is 2, and skip performing subsequent decoding;

d. otherwise, design a corresponding context model for the predicted residual of the projection residual of the current pixel for decoding, then determine whether the predicted residual obtained by parsing is greater than a specific threshold, and if the predicted residual is less than the specific threshold, skip performing subsequent decoding; otherwise, decode the predicted residual value of a part of which a predicted residual is greater than the threshold in an exponential Golomb decoding manner. Finally, 3 is added to the predicted residual value as the final predicted residual of the projection residual information obtained by parsing.

It should be noted that, if the encoder side quantizes the predicted residual of the projection residual information, the predicted residual obtained by parsing needs to be dequantized herein.

Step 2: Reconstruct a plurality of pieces of two-dimensional image information according to the parsed data.

In this embodiment, Step 2 may include the following steps.

reconstructing, according to predicted residuals of a projection residual information map in the parsed data, the projection residual information map to obtain a reconstructed projection residual information map.

Specifically, because at the encoder side, the plurality of pieces of two-dimensional image information may include a projection residual information map, that is, the projection residual information map is encoded, the code stream information at the decoder side correspondingly includes a projection residual information code stream. More specifically, the parsed data obtained by decoding the code stream information includes a predicted residual of the depth information.

Because in Embodiment 1, the encoder side traverses the pixels in the projection residual information map in a certain scanning order and encodes the projection residual information of non-empty pixels therein, predicted residuals of the pixel projection residual information obtained by the decoder side is also in this order, and the decoder side may obtain the resolution of the projection residual information map by using regularization parameters. For details, reference may be made to the part of initializing the two-dimensional projection plane structure in S2 in Embodiment 1. Therefore, the decoder side can know a position of a pixel currently to be reconstructed in the two-dimensional map according to the resolution of the projection residual information map and the placeholder information map.

Figure 10:
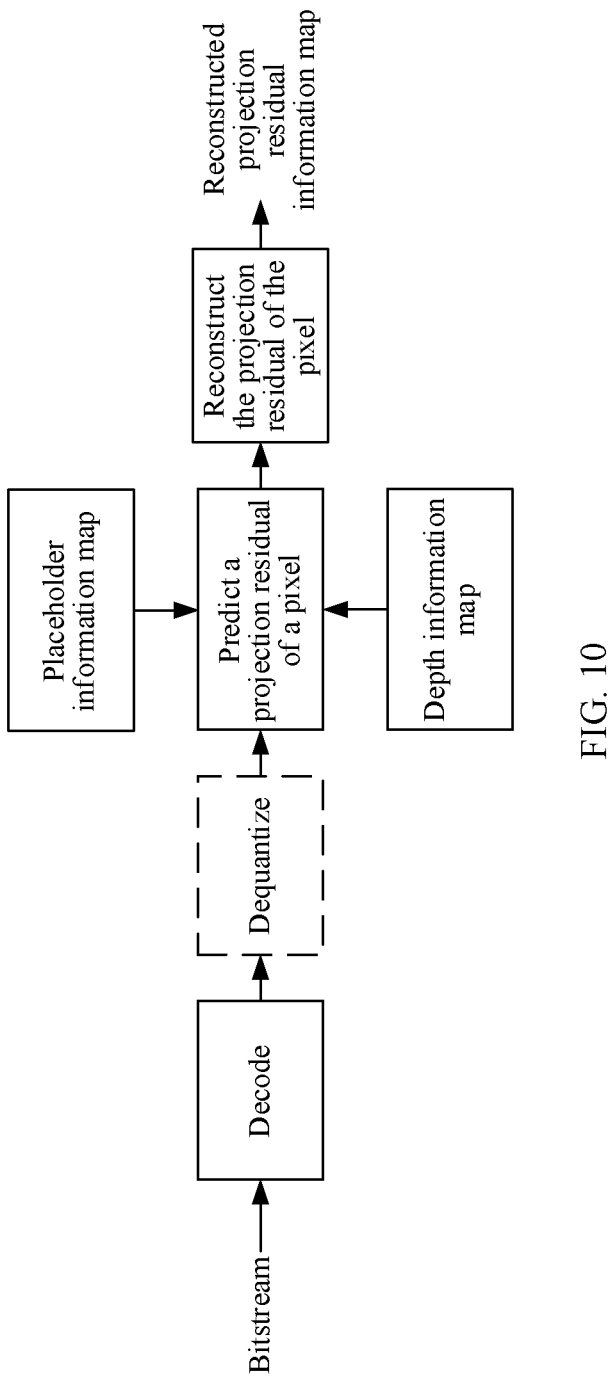
FIG. 10 is a decoding block diagram of a placeholder information map according to an embodiment of the present invention.

Specifically, FIG. 10 is a decoding block diagram of a depth information map according to an embodiment of the present invention. Projection residual information of the pixel currently to be reconstructed is predicted according to the placeholder information map, the depth information map, and the reconstructed projection residual information of encoded and decoded pixels, which is consistent with the prediction method on the encoder side. Firstly, the placeholder information map is used to determine the occupancy of the encoded and decoded pixels in the adjacent region of the pixel currently to be reconstructed, and then non-empty pixels therein are identified. Subsequently, the relationship between the depth information and the reconstructed projection residual information of the encoded and decoded non-empty pixels established by the encoder is used: If the depth information of two pixels is close, their projection residuals are also close, and pixels with depth information close to that of the pixel currently to be reconstructed may be selected from the encoded and decoded non-empty pixels as reference pixels, and reconstructed projection residual information of the reference pixel is averaged as a predicted value of the projection residual information of the current pixel. Subsequently, the projection residual information of the current pixel is reconstructed according to the obtained predicted value and the predicted residual obtained by parsing. After the projection residuals of all pixels are reconstructed, a reconstructed projection residual information map is obtained.

Step 3: Obtain a two-dimensional projection plane structure according to the two-dimensional image information.

Because the resolution of the two-dimensional projection plane structure is consistent with that of the projection residual information map, and the projection residual information map has been reconstructed, the projection residual information of each non-empty pixel in the two-dimensional projection plane structure can be known, to obtain a reconstructed two-dimensional projection plane structure.

Step 4: Reconstruct a point cloud by using the two-dimensional projection plane structure.

By traversing the pixels in the reconstructed two-dimensional projection plane structure in a certain scanning order, the projection residual information of each non-empty pixel can be known. If the current pixel (i, j) is non-empty, and it is known that the projection residual thereof is ($\Delta\phi$, $\Delta i$), other information such as depth information and coordinate conversion error information is used to reconstruct a space point (x, y, z) corresponding to the pixel. Specifically, the corresponding position of the current pixel (i, j) may be expressed as ($\phi_j$, i), then the regularization parameters and other information such as depth information r and coordinate conversion error information ($\Delta x$, $\Delta y$, $\Delta z$) may be used to reconstruct the space point (x, y, z) corresponding to the current pixel. The specific calculation is as follows:

$$\phi_j = -180° + j \times \Delta\phi$$

$$\theta_i = \theta_0$$

$$xl = r \cdot \sin(\phi_j - \alpha) - H_o \cdot \cos(\phi_j - \alpha)$$

$$yl = r \cdot \cos(\phi_j - \alpha) + H_o \cdot \sin(\phi_j - \alpha)$$

$$zl = r \cdot \tan\theta_i + V_o$$

$$(x,y,z) = (xl,yl,zl) + (\Delta x, \Delta y, \Delta z)$$

Finally, a corresponding space point can be reconstructed for each non-empty pixel in the two-dimensional projection structure according to the foregoing calculation, to obtain the reconstructed point cloud.

Embodiment 4

Figure 11:
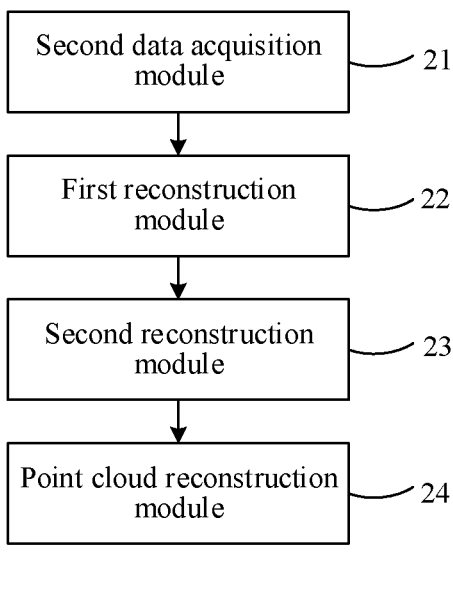
FIG. 11 is a schematic structural diagram of a point cloud decoding device based on a two-dimensional regularization plane projection according to an embodiment of the present invention.

Based on Embodiment 3, this embodiment provides a point cloud decoding device based on a two-dimensional regularization plane projection. FIG. 11 is a schematic structural diagram of a point cloud decoding device based on a two-dimensional regularization plane projection according to an embodiment of the present invention, which includes:

a second data acquisition module 21, configured to acquire code stream information and decode the code stream information to obtain parsed data;

a first reconstruction module 22, configured to reconstruct a plurality of pieces of two-dimensional image information according to the parsed data;

a second reconstruction module 23, configured to obtain a two-dimensional projection plane structure according to the plurality of pieces of two-dimensional image information; and a point cloud reconstruction module 24, configured to reconstruct a point cloud by using the two-dimensional projection plane structure.

The decoding device provided in this embodiment can implement the decoding method in Embodiment 5, and the detailed process is not described herein again.

The foregoing contents are detailed descriptions of the present invention with reference to specific exemplary embodiments, and it should not be considered that the specific implementation of the present invention is limited to these descriptions. A person of ordinary skill in the art, to which the present invention belongs, may further make several simple deductions or replacements without departing from the concept of the present invention, and such deductions or replacements should all be considered as falling within the protection scope of the present invention.

What is claimed is:

1. A point cloud encoding method based on a two-dimensional regularization plane projection, comprising:

acquiring original point cloud data;

performing two-dimensional regularization plane projection on the original point cloud data to obtain a two-dimensional projection plane structure;

obtaining a plurality of pieces of two-dimensional image information according to the two-dimensional projection plane structure, wherein the plurality of pieces of two-dimensional image information comprise projection residual information including an azimuth angle residual $\Delta\Phi$;

performing prediction on the azimuth angle residual $\Delta\Phi$ based on depth information to obtain a predicted residual of the azimuth angle residual $\Delta\Phi$; and encoding the predicted residual of the azimuth angle residual $\Delta\Phi$ to obtain code stream information.

2. The point cloud encoding method according to claim 1, wherein the plurality of pieces of two-dimensional image information comprise a projection residual information map, and the projection residual information map comprising the azimuth angle residual $\Delta\Phi$.

3. The point cloud encoding method based on a two-dimensional regularization plane projection according to claim 2, wherein the encoding the predicted residual of the azimuth angle residual $\Delta\Phi$ to obtain code stream information comprises:

encoding the predicted residual of the azimuth angle residual $\Delta\Phi$ to obtain a projection residual information code stream.

4. The point cloud encoding method according to claim 3, wherein the performing prediction on the azimuth angle residual $\Delta\Phi$ comprises:

performing prediction on a pixel in the projection residual information map based on a placeholder information map and a depth information map to obtain a predicted residual of a projection residual, wherein the predicted residual of the projection residual comprises the predicted residual of the azimuth angle residual $\Delta\Phi$.

5. The point cloud encoding method according to claim 4, wherein the performing prediction on the pixel in the projection residual information map comprises:

traversing pixels in the projection residual information map in a specific scanning order, and identifying encoded and decoded non-empty pixels in an adjacent region of a current non-empty pixel according to the placeholder information map;

establishing a relationship between depth information and reconstructed projection residual information by using the encoded and decoded non-empty pixels, and estimating projection residual information corresponding to a current pixel according to the relationship, to obtain an estimated value of the current pixel; and using the estimated value of the projection residual of the current pixel as a predicted value of the projection residual of the current pixel, to obtain a predicted residual of the projection residual of the current pixel.

6. The point cloud encoding method according to claim 1, wherein the performing prediction on the azimuth angle residual $\Delta\Phi$ comprises:

performing prediction on the azimuth angle residual $\Delta\Phi$ based on the depth information to obtain a predicted projection residual of a current pixel; and obtaining, according to a difference between an original projection residual and the predicted projection residual of the current pixel, a predicted residual of the projection residual of the current pixel.

7. The point cloud encoding method according to claim 1, wherein the performing two-dimensional regularization plane projection on the original point cloud data to obtain the two-dimensional projection plane structure comprises:

performing two-dimensional regularization plane projection on the original point cloud data according to regularization parameters to obtain the two-dimensional projection plane structure, wherein the regularization parameters include at least one of the following parameters: the quantity of laser scanners, and the horizontal sampling angular resolution.

8. A point cloud encoding device based on a two-dimensional regularization plane projection, the point cloud encoding device being configured to:

acquire original point cloud data;

perform two-dimensional regularization plane projection on the original point cloud data to obtain a two-dimensional projection plane structure;

obtain a plurality of pieces of two-dimensional image information according to the two-dimensional projection plane structure, wherein the plurality of pieces of two-dimensional image information comprise projection residual information including an azimuth angle residual $\Delta\Phi$;

perform prediction on the azimuth angle residual $\Delta\Phi$ based on depth information to obtain a predicted residual of the azimuth angle residual $\Delta\Phi$; and encode the predicted residual of the azimuth angle residual $\Delta\Phi$ to obtain code stream information.

9. A point cloud decoding method based on a two-dimensional regularization plane projection, comprising:

acquiring code stream information and decoding the code stream information to obtain parsed data, wherein the parsed data comprise a predicted residual of an azimuth angle residual $\Delta\Phi$;

reconstructing a plurality of pieces of two-dimensional image information according to the parsed data;

obtaining a two-dimensional projection plane structure according to the plurality of pieces of two-dimensional image information, wherein the plurality of pieces of two-dimensional image information comprise the azimuth angle residual $\Delta\Phi$; and reconstructing a point cloud by using the two-dimensional projection plane structure.

10. The point cloud decoding method according to claim 9, wherein the reconstructing the plurality of pieces of two-dimensional image information according to the parsed data comprises:

reconstructing, according to predicted residuals of a projection residual information map in the parsed data, the projection residual information map to obtain a reconstructed projection residual information map.

\* \* \* \* \*